United States Patent
Zou et al.

(10) Patent No.: US 9,772,768 B2
(45) Date of Patent: Sep. 26, 2017

(54) TOUCH PAGE CONTROL METHOD AND SYSTEM (71) Applicant: TENCENT TECHNOLOGY (SHENZHEN) COMPANY LIMITED, Shenzhen (CN)

(72) Inventors: Difei Zou, Shenzhen (CN); Jun Huang, Shenzhen (CN); Yanjun Luo, Shenzhen (CN); Shengwei Lin, Shenzhen (CN); Yusheng Zhong, Shenzhen (CN); Deliang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 150 days.

(21) Appl. No.: 14/437,201

(22) PCT Filed: Oct. 24, 2013

(86) PCT No.: PCT/CN2013/085881
§ 371 (c)(1),
(2) Date: Apr. 21, 2015

(87) PCT Pub. No.: WO2014/063643
PCT Pub. Date: May 1, 2014

(65) Prior Publication Data
US 2015/0277747 A1    Oct. 1, 2015

(30) Foreign Application Priority Data

Oct. 24, 2012   (CN) .......................... 2012 1 0409083

(51) Int. Cl.
G06F 3/0488    (2013.01)
G06F 3/0484    (2013.01)
G06F 3/048     (2013.01)

(52) U.S. Cl.
CPC ...... *G06F 3/04883* (2013.01); *G06F 3/04842* (2013.01); *G06F 3/04886* (2013.01); *G06F 2203/04803* (2013.01)

(58) Field of Classification Search
CPC ............. G06F 3/04883; G06F 3/04842; G06F 3/04886; G06F 2203/04803
See application file for complete search history.

(56) References Cited

U.S. PATENT DOCUMENTS 6,476,834 B1 * 11/2002 Doval .................. G06F 9/4443
                                                           715/826
8,364,688 B1 *  1/2013 Thomas ................ G06Q 10/10
                                                           707/709
(Continued)

FOREIGN PATENT DOCUMENTS

CN    102063244 A    5/2011
CN    102193720 A    9/2011
(Continued)

OTHER PUBLICATIONS

Written Opinion (English translation), International Application No. PCT/CN2013/085881, dated Feb. 6, 2014.
(Continued)

*Primary Examiner* — Jeanette J Parker
(74) *Attorney, Agent, or Firm* — Marshall, Gerstein & Borun LLP (57) ABSTRACT

The present disclosure relates to a touch page control method, including: receiving a page opening request; performing determination on a page to be opened, to determine whether controls exist in the page; counting, if the controls exist in the page, the number of the controls, and determining locations of the controls; creating gesture areas according to the number of the controls, where the number of the gesture areas corresponds to the number of the controls; and displaying, in the gesture areas, gestures required for acti- (Continued)

vating the corresponding controls. In addition, the present disclosure further provides a touch page control system.

10 Claims, 7 Drawing Sheets

(56) References Cited

U.S. PATENT DOCUMENTS

| | | | |
|---|---|---|---|
| 8,436,821 B1* | 5/2013 | Plichta | G06F 3/04883 345/156 |
| 8,847,880 B2* | 9/2014 | Lu | G06F 3/017 345/156 |
| 2010/0058252 A1* | 3/2010 | Ko | G06F 3/04883 715/863 |
| 2010/0273533 A1 | 10/2010 | Cho | |
| 2012/0054620 A1* | 3/2012 | Tilley | G06F 1/1626 715/727 |
| 2012/0242604 A1* | 9/2012 | Kato | H04N 1/00381 345/173 |
| 2015/0020035 A1 | 1/2015 | Liang et al. | |

FOREIGN PATENT DOCUMENTS

| | | |
|---|---|---|
| CN | 102193735 A | 9/2011 |
| CN | 102236502 A | 11/2011 |
| CN | 102681774 A | 9/2012 |

OTHER PUBLICATIONS

Search Report in International Application No. PCT/CN2013/085881 dated Feb. 6, 2014, 4 pages.
Office Action from Chinese Application No. 2012104090830 dated Apr. 19, 2017.
International Preliminary Report on Patentability from Application No. PCT/CN2013/085881 dated Apr. 28, 2015.

* cited by examiner

TOUCH PAGE CONTROL METHOD AND SYSTEM

RELATED APPLICATION

This application claims priority to Chinese Patent Application No. 201210409083.0, entitled "TOUCH DEVICE PAGE CONTROL METHOD AND SYSTEM" filed on Oct. 24, 2012, which is incorporated by reference in its entirety.

FIELD OF THE TECHNOLOGY

The present disclosure relates to touch technologies of terminals, and in particular, to a touch page control method and system.

BACKGROUND OF THE DISCLOSURE

For a touch electronic device at a present stage, for example, a mobile phone with a touch screen and a tablet computer, a specific operation is mainly performed through a touch action that is agreed upon. For example, operations such as page turning, forward, rewind, and page zooming are performed by using specific gestures. However, a user who uses a touch electronic device for the first time can only know these actions after fumbling for a long time or consulting others, which increases learning cost of the user, and causes undesirable user experience.

In addition, operation buttons exist on operation pages of some software as well as some web pages such as a page for software downloading and a page for song playback. If an operation such as playing a video, downloading software, and playing a song needs to be performed, the foregoing buttons need to be activated in a touching manner to perform a required operation. However, because a display screen of a touch electronic device at the present stage is relatively small, these buttons are also relatively small, making it easy to touch an adjacent button by accident when the foregoing buttons are touched, resulting in an incorrect operation.

SUMMARY

In view of this, it is necessary to provide a touch page control method and system that make it difficult for an incorrect operation to occur.

The touch page control method and system are implemented by using the following technical solutions:

A touch page control method includes: receiving a page opening request; performing determination on a page to be opened, to determine whether controls exist in the page; counting, if the controls exist in the page, the number of the controls, and determining locations of the controls; creating gesture areas according to the number of the controls, the number of the gesture areas corresponding to the number of the controls; and displaying, in the gesture areas, gestures required for activating the corresponding controls.

A touch page control system includes: a request receiving unit, configured to receive a page opening request; a determination unit, configured to perform determination on a page to be opened, to determine whether controls exist in the page; a control information determination unit, configured to count, when the controls exist in the page, the number of the controls, and determine locations of the controls; a gesture area creation unit, configured to create gesture areas according to the number of the controls, the number of the gesture areas corresponding to the number of the controls; and a display unit, configured to display, in the gesture areas, gestures required for activating the corresponding controls.

A method for creating a graphical user interface used in a touch device includes: creating operable controls; creating gesture sign areas corresponding to the controls, the gesture sign areas displaying gestures that can activate operations same as that activated by the corresponding controls; and creating gesture operation areas used for receiving a gesture of a user.

A touch device includes a memory and a processor, the memory storing executable program code, the executable program code being operable for: when the executable program code is executed by the processor, creating operable controls; creating gesture sign areas corresponding to the controls, the gesture sign areas displaying gestures that can activate operations same as that activated by the corresponding controls; and creating gesture operation areas used for receiving a gesture of a user.

A non-transitory computer program product including executable program code used in a touch device is provided, the executable program code being operable for: when the executable program code is executed by the processor, creating operable controls; creating gesture sign areas corresponding to the controls, the gesture sign areas displaying gestures that can activate operations same as that activated by the corresponding controls; and creating gesture operation areas used for receiving a gesture of a user.

According to the touch page control method and system of the present disclosure, gesture areas corresponding to controls are displayed in a page, and gestures required for activating the corresponding controls are displayed in the gesture areas, so that for a page operated by using the method and system, various operation gestures do not need to be learned during operation, which lowers learning cost of a user. In addition, gestures displayed in gesture areas enable controls in a page to be activated by using different gestures, and compared with a manner of activating a control through touching, a probability of an incorrect operation may be lowered.

In order to make the foregoing and other objectives, features, and advantages of the present disclosure more comprehensible, preferred embodiments are given below, and detailed description is made in the following with reference to the accompanying drawings.

DESCRIPTION OF EMBODIMENTS

To further explain the technical means used in the present disclosure for achieving the intended objectives and the efficacy thereof, specific implementation manners, structures, features, and efficacy of a touch page control method and system proposed on the basis of the present disclosure are described in detail below with reference to the accompanying drawings and preferred embodiments.

First, it should be noted that, a touch device in the present disclosure mainly includes a mobile phone with a touch screen and a tablet computer, and is not limited thereto. A page having a control in the present disclosure refers to a page including an operable control, for example, an operation page of Xunlei Kankan or PPTV, a software downloading page, and a song playback page, and is not limited thereto. A control that is included in the operation page of Xunlei Kankan or PPTV and is to be activated through an operation, for example, a button to be activated through clicking, may be a control for selecting a category to watch, for example, movie, TV show, and animation, or may be a playback operation control, for example, watch now and download. A control contained in the software downloading page and the song playback page may be a control including download and play.

Figure 1:
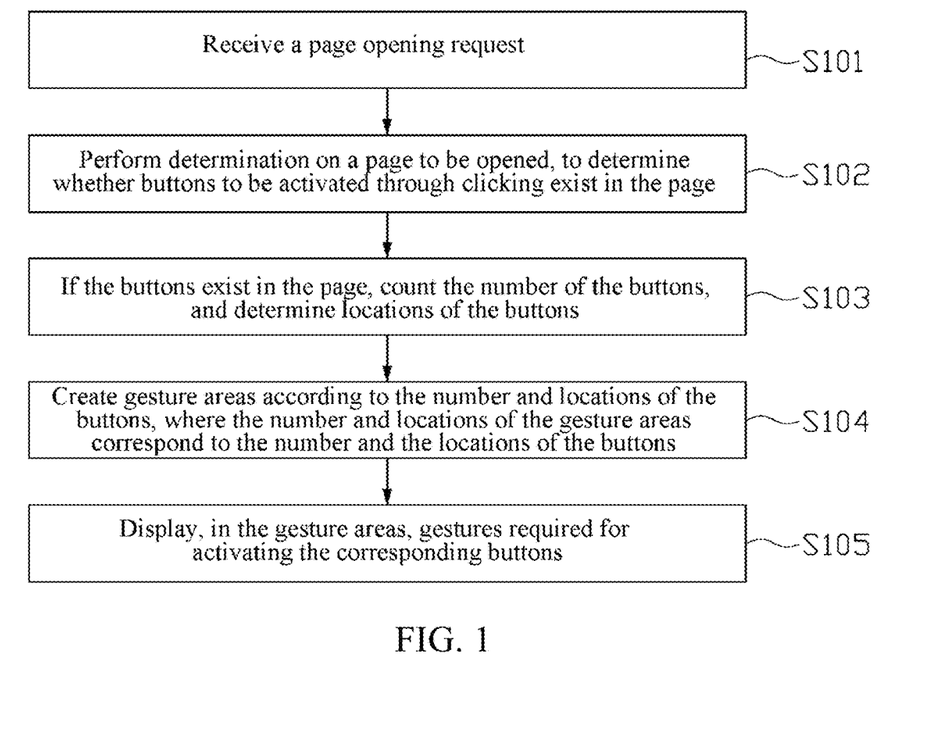
FIG. 1 is a flowchart of a touch page control method disclosed by the present disclosure.

FIG. 1 is a flowchart of a touch page control method disclosed by an embodiment of the present invention. As shown in FIG. 1, the method of the present disclosure includes the following steps:

Step S101: Receive a page opening request.

Step S102: Perform determination on a page to be opened, to determine whether controls exist in the page.

Step S103: If the controls exist in the page, count the number of the controls, and determine locations of the controls.

Step S104: Create gesture areas according to the number and the locations of the controls, where the number and locations of the gesture areas correspond to the number and the locations of the controls.

Step S105: Display, in the gesture areas, gestures required for activating the corresponding controls.

Figure 2:
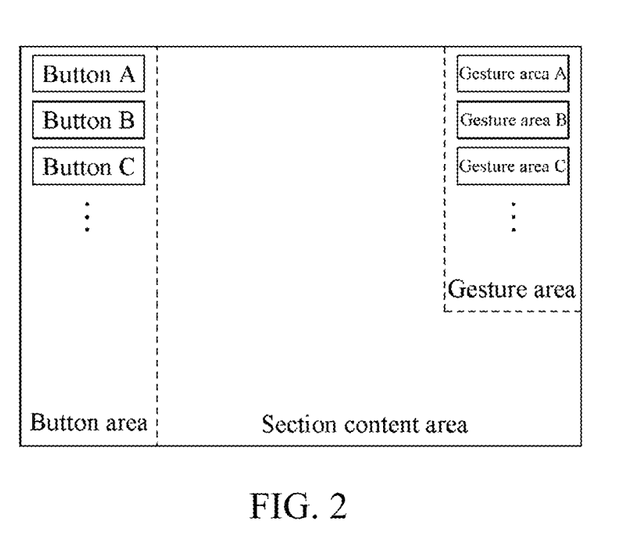
FIG. 2 is a schematic diagram of a page after gesture areas are created in the method shown in FIG. 1.

FIG. 2 is a schematic diagram of a page after gesture areas are created in the method shown in FIG. 1. In FIG. 2, the page includes three areas, and the three areas are separately a control area, a section content area, and a gesture area. The control area is located on the left side of the page, and includes three controls. By using an example in which the page is a page of Xunlei Kankan or PPTV, the three controls may separately be a movie control, a TV show control, and an animation control. The section content area is located on the right side of the page, and is used for displaying content of a section corresponding to each control. By using an example in which the page is a page of Xunlei Kankan or PPTV, the section content area displays, by default, content corresponding to the first control of the control area, that is, the movie control, and the content may include information, such as names and pictures of multiple movies. When the TV show control or the animation control is activated, content in the section content area can be correspondingly adjusted to content corresponding to the TV show control or the animation control. The gesture area is located in the upper right corner of the section content area, and is used for displaying a gesture required for activating a corresponding control. In the embodiment shown in FIG. 2, the gesture area includes three gesture areas A, B, and C. Locations of the three gesture areas correspond to locations of the three controls in the control area, and an area of each of the three gesture areas is separately greater than an operable area of a corresponding control.

Figure 3:
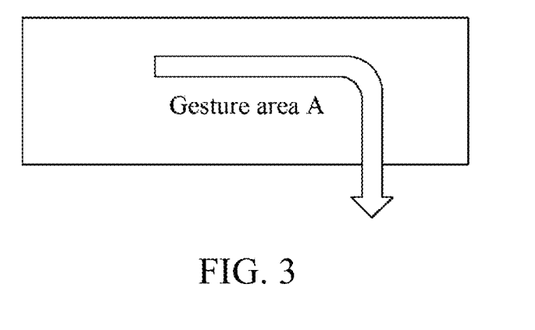
FIG. 3 is a schematic diagram of a gesture displayed in a gesture area A in FIG. 2.

FIG. 3 is a schematic diagram of a gesture displayed in a gesture area A in FIG. 2. As shown in FIG. 3, a gesture in the gesture area A in FIG. 2 is activated by starting from the left end of the gesture area A, sliding horizontally or approximately horizontally to the right by an area to the right end of the gesture area, and then continuing to slide downwards vertically by a distance, where a distance of vertical sliding is not less than a quarter of a distance of horizontal sliding. It should be noted that, in the present disclosure, gestures displayed in various gesture areas may be the same or different, and in a preferred manner, the gestures of the gesture areas are different, so that an incorrect operation caused by same gestures can be avoided. In addition, in the present disclosure, locations of the gesture areas are not limited thereto, and may be adjusted according to the locations of the controls, or the gesture areas are set in a blank part of the page or a part with less text. When the gesture areas are set in the blank area of the page or the part with less text, a step of determining page text needs to be added to determine the distribution of text on the page. Specifically, after it is determined that the controls exist in the page, the distribution of content (including text, pictures, and the like) in the page is determined, and a gesture operation area is displayed in an area whose content is less than a predetermined value. In an embodiment, the predetermined value may involve a ratio of area of the content in the area. For example, the gesture area is displayed when the ratio of the area of the content in the area is less than 20%.

Figure 4:
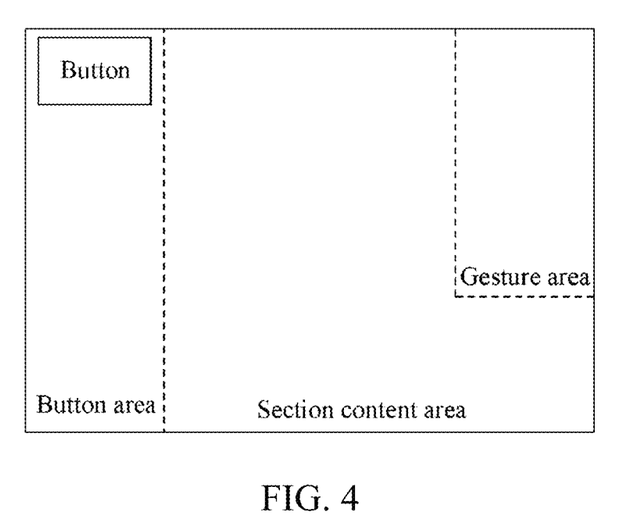
FIG. 4 is a schematic diagram of another page after a gesture area is created in the method shown in FIG. 1.
Figure 5:
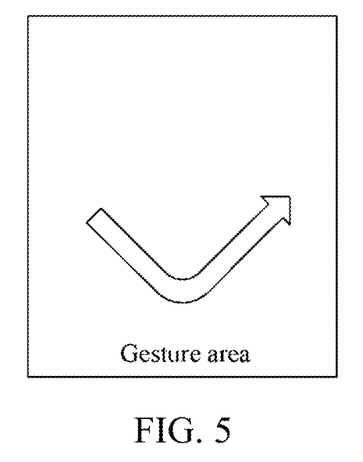
FIG. 5 is a schematic diagram of a gesture displayed in a gesture area in FIG. 4.

In the embodiment shown in FIG. 2, the control area includes three controls. It may be understood that, the control area may also include another number of controls. For example, in FIG. 4, the control area only includes one control, and the control may be a software downloading control or a song playback control. Correspondingly, content displayed in the section content area may be related information such as a developer, a version, and an operating environment of the software, or may be related information, such as a singer, a lyricist, and a tunesmith of the song, and an album to which the song belongs. FIG. 5 is a schematic diagram of a gesture displayed in a gesture area in FIG. 4. FIG. 5 shows that a gesture for activating a control in FIG. 4 is a V-shaped gesture.

Further, the method may further include: setting in advance gestures required for activating controls of specific types. Correspondingly, in the step of determining the number and the locations of the controls, the method further includes determining types of the controls; before the step of the displaying, in the gesture areas, gestures required for activating the corresponding controls, the method further includes extracting the required gestures from the set gestures according to the types of the controls, where, in the step of the displaying, in the gesture areas, gestures required for activating the corresponding controls, the displayed gestures are the gestures extracted from the set gestures.

Further, after step S105, the method may further include: drawing a corresponding trajectory in a gesture area according to a displayed gesture; determining whether the trajectory is consistent with the displayed gesture; and if the trajectory is consistent with the displayed gesture, activating a control corresponding to the gesture area.

Further, after the corresponding trajectory is drawn in the gesture area according to the displayed gesture, the method may further include: calibrating the drawn trajectory; and correspondingly, whether the trajectory is consistent with the displayed gesture is determined according to a calibration result. It should be noted that, the scope of calibration includes calibration of straightness and a length of the drawn trajectory and an area where drawing is performed. The calibration is used for eliminating a deviation between a gesture of an actual operation and an ideal value. For example, curvature may exist when a straight line is actually drawn, and the calibration may be used for determining, as the straight line, a curve whose radius of curvature is greater than a predetermined value. The straightness includes straightness of each section of the trajectory. For example, in FIG. 3, the straightness includes straightness of a horizontal section and a vertical section of the trajectory. The length includes a length of each section of the trajectory, and in FIG. 3, the length includes lengths of a horizontal section and a vertical section of the trajectory. The area where drawing is performed refers to an area of a smallest rectangle covering all endpoints of the trajectory. Calibration on the area where drawing is performed refers to that, if the area where drawing is performed exceeds a range of a corresponding gesture area within a certain error range, it is also considered that the area where drawing is performed does not exceed the range of the gesture area. For example, when the gesture shown in FIG. 3 is made, if the gesture area A is exceeded within an allowed error range when vertical sliding is performed, it is considered that the gesture does not exceed the gesture area A.

It may be known from the foregoing description that, according to the touch page control method of the present disclosure, gesture areas corresponding to controls are displayed in a page, and gestures required for activating the corresponding controls are displayed in the gesture areas, so that for a page operated by using the method, various operation gestures do not need to be learned during operation, which lowers learning cost of a user. In addition, gestures displayed in gesture areas enable controls in a page to be activated by using different gestures, and compared with a manner of activating a control through touching, a probability of an incorrect operation may be lowered. Further, because an area of a gesture area in the present disclosure is greater than an operable area of a corresponding control, a probability of an incorrect operation is further lowered.

Figure 6:
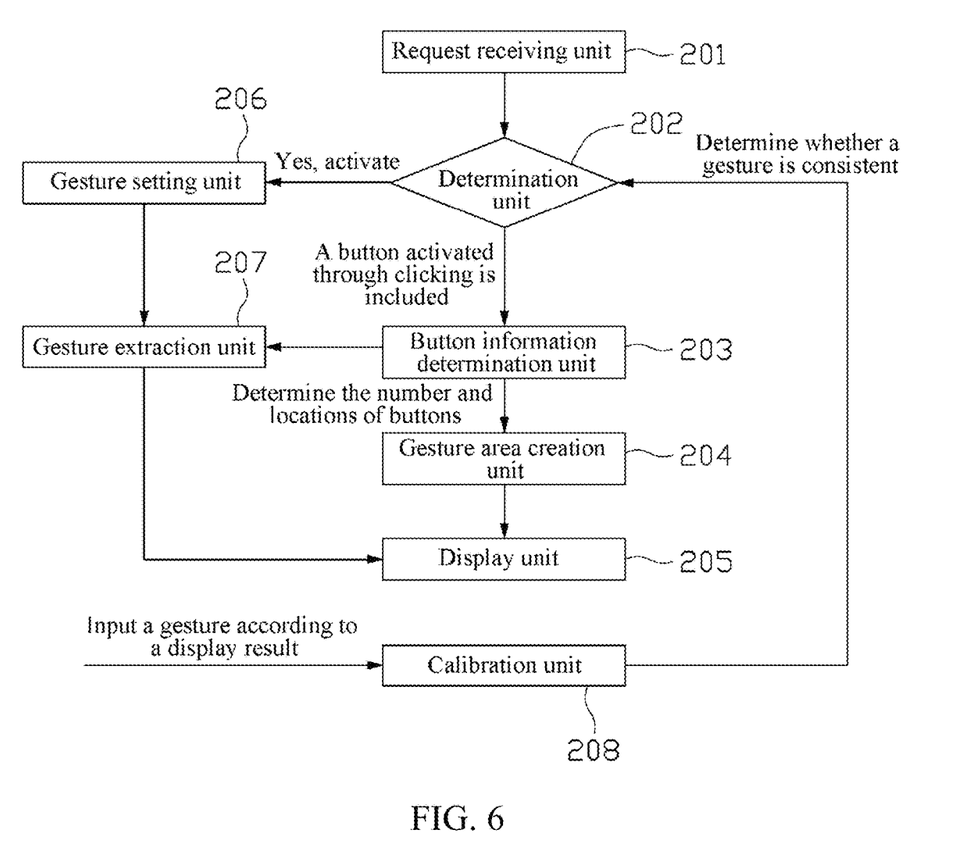
FIG. 6 is schematic block diagram of a touch page control system disclosed by the present disclosure.

FIG. 6 is schematic block diagram of a touch page control system disclosed by the present disclosure. As shown in FIG. 6, the touch page control system of the present disclosure includes a request receiving unit 201, a determination unit 202, a control information determination unit 230, a gesture area creation unit 204, and a display unit 205, where:

the request receiving unit 201 is configured to receive a page opening request;

the determination unit 202 is configured to perform determination on a page to be opened, to determine whether controls exist in the page;

the control information determination unit 203 is configured to count, when the controls exist in the page, the number of the controls and determine locations of the controls; and the gesture area creation unit 204 is configured to create gesture areas according to the number and the locations of the controls, where the number and locations of the gesture areas correspond to the number and the locations of the controls; and an area of each of the gesture areas is greater than an operable area of a corresponding control.

The display unit 205 is configured to display, in the gesture areas, gestures required for activating the corresponding controls.

Further, the system further includes a gesture setting unit 206, configured to set in advance gestures required for activating controls of specific types. In an embodiment in which the system includes the gesture setting unit 206, the control information determination unit 203 is further configured to determine types of the controls. In the embodiment in which the system includes the gesture setting unit 206, the system further includes a gesture extraction unit 207, configured to extract required gestures from the gesture setting unit 206 according to the types of the controls.

Further, the determination unit 202 is further configured to display, in the gesture areas, the gestures required for activating the corresponding controls; determine, after a corresponding activation gesture is made in a gesture area according to a displayed gesture, whether the gesture acting on the gesture area is consistent with the displayed gesture; and if the gesture acting on the gesture area is consistent with the displayed gesture, activate a corresponding control.

Further, the system further includes a calibration unit 208, configured to calibrate a trajectory of the gesture acting on the gesture area. In the embodiment in which the system includes the calibration unit 208, the determination unit 202 performs determination after calibration by the calibration unit 208. The scope of calibration includes calibration of straightness and a length of the drawn trajectory and an area where drawing is performed.

It may be known from the foregoing description that, according to the touch page control system of the present disclosure, gesture areas corresponding to controls are displayed in a page, and gestures required for activating the corresponding controls are displayed in the gesture areas, so that for a page operated by using the system, various operation gestures do not need to be learned during operation, which lowers learning cost of a user. In addition, gestures displayed in gesture areas enable controls in a page to be activated by using different gestures, and compared with a manner of activating a control through touching, a probability of an incorrect operation may be lowered. Further, because an area of a gesture area in the present disclosure is greater than an operable area of a corresponding control, a probability of an incorrect operation is further lowered.

Figure 7:
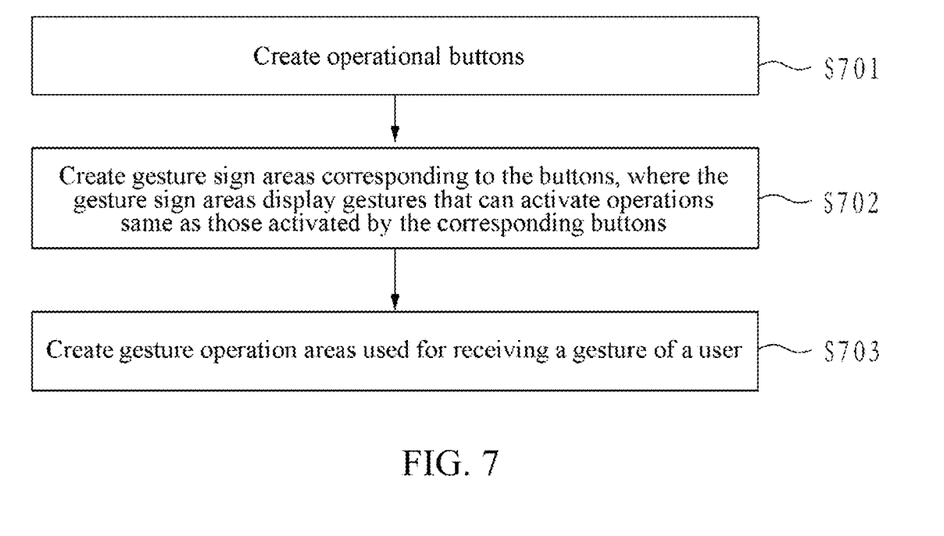
FIG. 7 is a flowchart of a method, which is disclosed by the present disclosure, for creating a graphical user interface used in a touch device.

Another aspect of the present disclosure further provides a method for creating a graphical user interface used in a touch device. As shown in FIG. 7, the method includes the following steps:

Step S701: Create operable controls. The creation method may be applied to various applications including controls, and operations corresponding to the controls may be activated by operations on the controls.

Step S702: Create gesture sign areas corresponding to the controls, where the gesture sign areas display gestures that can activate operations same as those activated by the corresponding controls.

Figure 9:
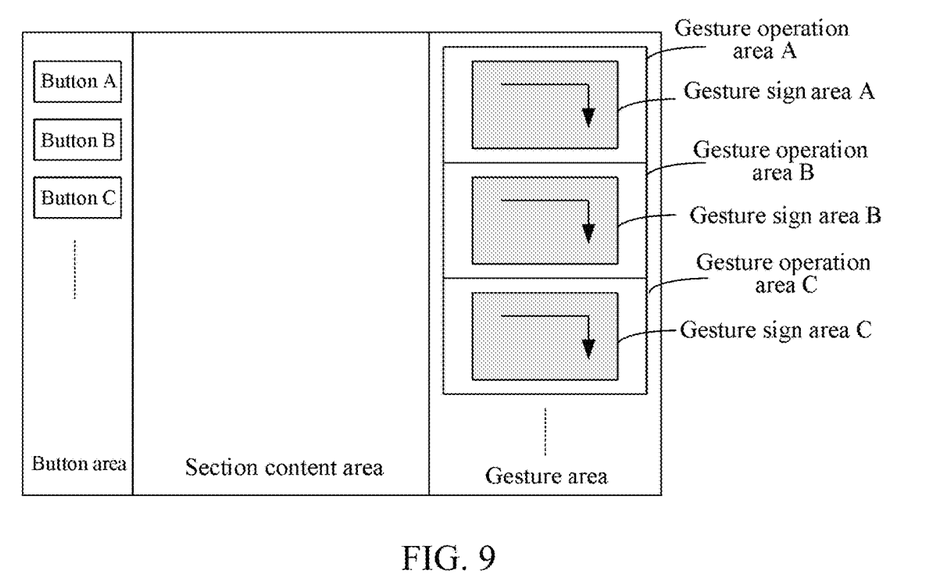
FIG. 9 is a schematic diagram of a graphical user interface created in a method provided by the present disclosure.
Figure 10:
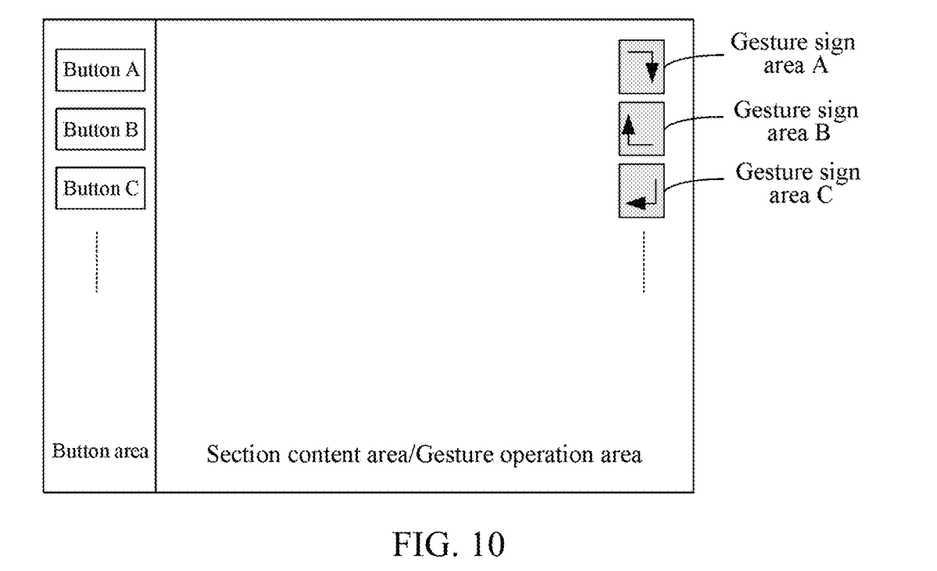
FIG. 10 is a schematic diagram of another graphical user interface created in a method provided by the present disclosure.

The gesture sign areas may correspond to the controls in various manners. In an embodiment, locations of the controls and the gesture sign areas may be arranged in a same manner. Referring to FIG. 9 and FIG. 10, a control A located at the topmost location corresponds to a gesture operation area A; a control C located at the bottom corresponds to a gesture operation area C; and a control B located in the middle corresponds to a gesture operation area B. Certainly, the number of the controls is not limited to the number shown in FIG. 9 and FIG. 10, and may be less than 3 or greater than 3. In another embodiment, the controls and corresponding gesture operation areas may be in a one-to-one correspondence by using different colors. For example, the control A and the gesture operation area A are labeled red; the control B and the gesture operation area B are labeled yellow; and the control C and the gesture operation area C are labeled blue. In another embodiment, which control corresponds to which gesture operation area may further be indicated to a user in another manner.

A gesture needing to be used by a corresponding operation for activating a corresponding control is displayed in a corresponding gesture operation area. The gesture required by the activation operation is described below in detail with reference to two embodiments of the present invention.

Step S703: Create gesture operation areas used for receiving a gesture of a user.

In an embodiment, the gesture operation areas may be in a one-to-one correspondence to the gesture sign areas, so that the gesture operation areas are in a one-to-one correspondence to the controls. That is, the gesture operation areas whose number corresponds to the number of the controls are created, and correspondences between the gesture operation areas and the controls may be indicated in the foregoing corresponding manner. For example, correspondences are indicated according to location relationships or labels such as colors. The gesture operation areas may separately receive the gestures corresponding to the gesture sign areas, so as to activate operations that can be activated by the corresponding controls. In this case, a same gesture or different gestures may be displayed in different gesture sign areas. Preferably, the gesture sign areas are separately located in corresponding gesture operation areas, so that the correspondences between the gesture sign areas and the controls are used. As shown in FIG. 9, a gesture sign area A is located in a corresponding gesture operation area A, a gesture sign area B is located in a corresponding gesture operation area B, and a gesture sign area C is located in a corresponding gesture operation area C. The gesture sign area is located in the gesture operation area, and the gesture sign area coincides with the gesture operation area.

In a preferred embodiment, an area of each gesture operation area is greater than an operable area of a corresponding control. Referring to FIG. 9, the area of the gesture operation area is greater than the operable area of the control, so that the user performs a gesture operation in the gesture operation area.

In another embodiment, referring to FIG. 10, one gesture operation area is provided. As an example, the gesture operation area may be located at any location in an interface. A gesture of a user is any one of gestures that can activate operations same as those activated by the corresponding controls. That is, various gestures for activating operations corresponding to various controls may be received in the gesture operation areas. Activation of an operation corresponding to the control A may be performed in the gesture operation area, and activation of operations corresponding to the control B and the control C may also be performed in the gesture operation area. Based on such a setting manner, the area of the gesture operation area is expanded, and the user can conveniently perform an accurate operation.

Preferably, when multiple controls are displayed in the interface, each of the controls separately corresponds to a different gesture. As shown in FIG. 10, different gestures are separately displayed in the gesture sign area A to the gesture sign area C. As an example, a sign displayed in the gesture sign area A is "↱", a sign displayed in the gesture sign area B is "↳", and a sign displayed in the gesture sign area C is "↵". In this way, if a gesture operation received in the gesture operation area is "↱", the operation corresponding to the control A may be activated.

Figure 8:
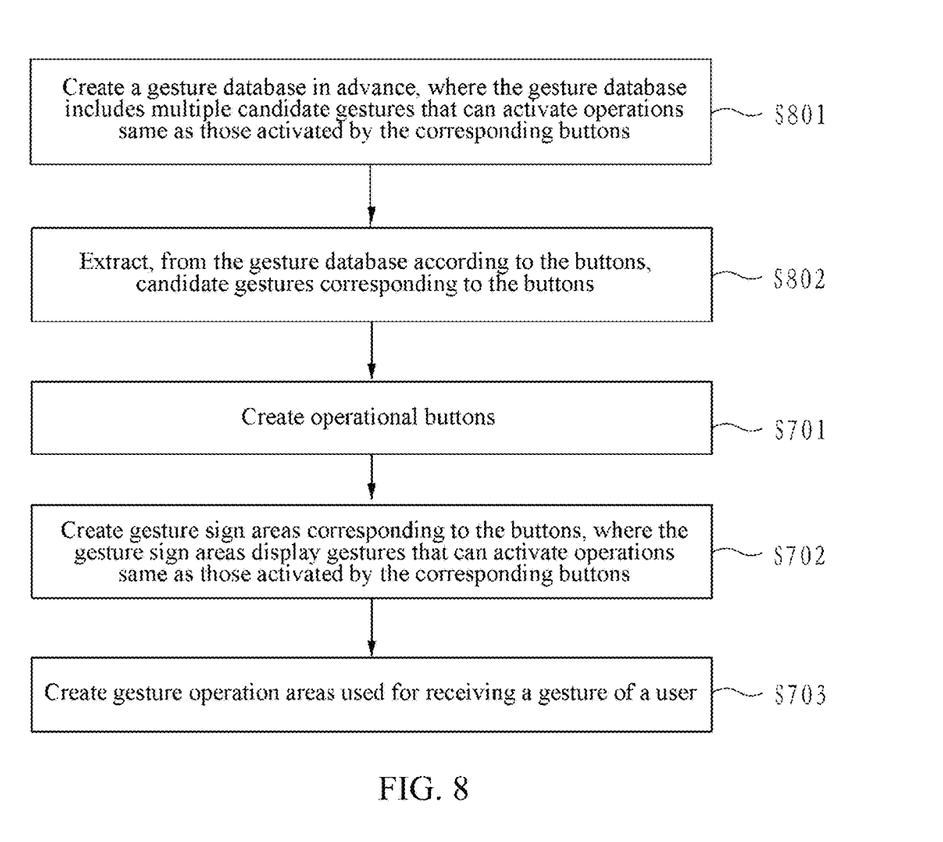
FIG. 8 is a flowchart of another method, which is disclosed by the present disclosure, for creating a graphical user interface used in a touch device.

Further, before the creating gesture sign areas corresponding to the controls (that is, step 702), the method of the present disclosure further includes the following steps, referring to FIG. 8:

Step 801: Create a gesture database in advance, where the gesture database includes multiple candidate gestures that can activate the operations same as those activated by the corresponding controls. As an example, gestures for activating operations corresponding to various controls that may appear in a different interface may be created.

Step 802: Extract, from the gesture database according to the controls, candidate gestures corresponding to the controls, where the candidate gestures are used for creating the gesture sign areas corresponding to the controls. Corresponding candidate gestures are found from the gesture database according to controls appearing in an interface to be displayed, and are used as gestures for activating the operations corresponding to the controls.

Step 701 to step 703 included in FIG. 8 are respectively the same as or similar to step 701 to step 703 shown in FIG. 7, and therefore, are not described herein again.

As shown in FIG. 2, FIG. 4, FIG. 9, and FIG. 10, the graphical user interface may further include a section content area, and the section content area occupies an area except control areas. The gesture operation area and/or the gesture sign area may be located in blank areas in the section content area or an area with less content. In another embodiment, as shown in FIG. 9, the gesture operation area and/or the gesture sign area may be separated from the section content area. In an embodiment (for example, an embodiment shown in FIG. 10) only including one gesture operation area, the section content area may coincide with the gesture operation area.

When none of the operations corresponding to the controls is activated, predetermined content is displayed. The predetermined content may be set by a user or by default, and the predetermined content may be, for example, section content corresponding to the control A. When one of the operations corresponding to multiple controls is activated, content corresponding to the activated operation is displayed. For example, when the operation corresponding to the control B is activated, content corresponding to the operation may be displayed.

Another aspect of the present disclosure further provides a touch device, including a memory and a processor, where the memory stores executable program code, and the executable program code may be used for: when the executable program code is executed by the processor, creating operable controls; creating gesture sign areas corresponding to the controls, where the gesture sign areas display gestures that can activate operations same as those activated by the corresponding controls; and creating gesture operation areas used for receiving a gesture of a user.

Still another aspect of the present disclosure further provides a non-transitory computer program product including executable program code used in a touch device. The non-transitory computer program product includes non-transitory digital data storage medium, for example, a magnetic disk or an optical disc, a random access memory (RAM), a magnetic type disk, a flash memory and/or a read-only memory (ROM). In an embodiment, the executable program code may be used for: when the executable program code is executed, creating operable controls; creating gesture sign areas corresponding to the controls, where the gesture sign areas display gestures that can activate operations same as those activated by the corresponding controls; and creating gesture operation areas used for receiving a gesture of a user. In another embodiment, the executable program code may be used for: when the executable program code is executed, receiving a page opening request; performing determination on a page to be opened, to determine whether controls exist in the page; counting, if the controls exist in the page, the number of the controls, and determining locations of the controls; creating gesture areas according to the number of the controls, where the number of the gesture areas corresponds to the number of the controls; and displaying, in the gesture areas, gestures required for activating the corresponding controls.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A touch page control method, the method comprising:
    receiving a page opening request;
    in response to receiving a page opening request, performing determination on a page to be opened, to determine whether controls exist in the page;
    in response to determining controls exist in the page, determining a number of the controls, determining locations of the controls, and determining a type of control for each of the controls;
    setting touch gestures, each of the set touch gestures corresponding to each of the controls, each of the set gesture is a touch gesture required to activate each of the corresponding controls, each of touch gestures based on the type of control;
    extracting from the set gestures, the touch gesture required according to the determined type of control for each of the controls;
    creating touch gesture areas to receive touch gestures according to the determined number of the controls, a number of the gesture areas corresponding to the determined number of the controls; and
    displaying, in each of the touch gesture areas, a touch gesture required for activating each of the corresponding controls, each of the touch gestures extracted from the set gestures, each of the touch gesture area enabled to receive the displayed touch gesture that activates each of the corresponding controls.

2. The touch page control method according to claim 1, wherein an area of each of the gesture areas is larger than an operable area of a corresponding control.

3. The touch page control method according to claim 1, wherein the method further comprises:
    detecting a touch gesture with a trajectory in a gesture area;
    determining whether the trajectory matches with the displayed gesture; and
    in response to determining the trajectory matches with the displayed gesture, activating a control corresponding to the gesture area.

4. The touch page control method according to claim 3, wherein the method further comprises:
    calibrating the trajectory; and wherein whether the trajectory matches with the displayed gesture is determined according to a calibration result.

5. The touch page control method according to claim 4, wherein the scope of calibration comprises calibration of straightness and a length of the trajectory and an area where the touch gesture is performed.

6. A touch page control system, comprising:
    a processor;
    a memory which stores non-transitory computer readable instruction that when executed by the processor cause the processor to:
    receive a page opening request;
    in response to receiving a page opening request, perform determination on a page to be opened, to determine whether controls exist in the page;
    determine, in response to determining controls exist, a number of the controls, determine locations of the controls, and determine a type of control for each of the controls;
    set touch gestures, each of the set touch gestures corresponding to each of the controls, each of the set gesture is a touch gesture required to activate each of the corresponding controls, each of touch gestures based on the type of control;
    extract from the set gestures, the touch gesture required according to the type of control for each of the controls;
    create touch gesture areas to receive touch gestures according to the determined number of the controls, a number of the gesture areas corresponding to the determined number of the controls; and
    display, in each of the touch gesture areas, a touch gesture required for activating each of the corresponding controls, each of the touch gestures extracted from the set gestures, each of the touch gesture area enabled to receive the displayed touch gesture that activates each of the corresponding controls.

7. The touch page control system according to claim 6, wherein an area of each of the gesture areas is larger than an operable area of a corresponding control.

8. The touch page control system according to claim 6, wherein the non-transitory computer readable instructions further cause the processor to:
    detect a touch gesture with a trajectory in a gesture area;
    determine whether the trajectory matches with the displayed gesture; and
    in response to determining the trajectory matches with the displayed gesture, activate a control corresponding to the gesture area.

9. The touch page control system according to claim 8, wherein the non-transitory computer readable instructions further cause the processor to:
    calibrate the trajectory; and wherein whether the trajectory matches with the displayed gesture is determined according to a calibration result.

10. The touch page control system according to claim 9, wherein the scope of calibration comprises calibration of straightness and a length of the trajectory and an area where the touch gesture is performed.

* * * * *